A. F. Ahrens,
Furniture Caster.
Nº 5,102.      Patented May 8, 1847.
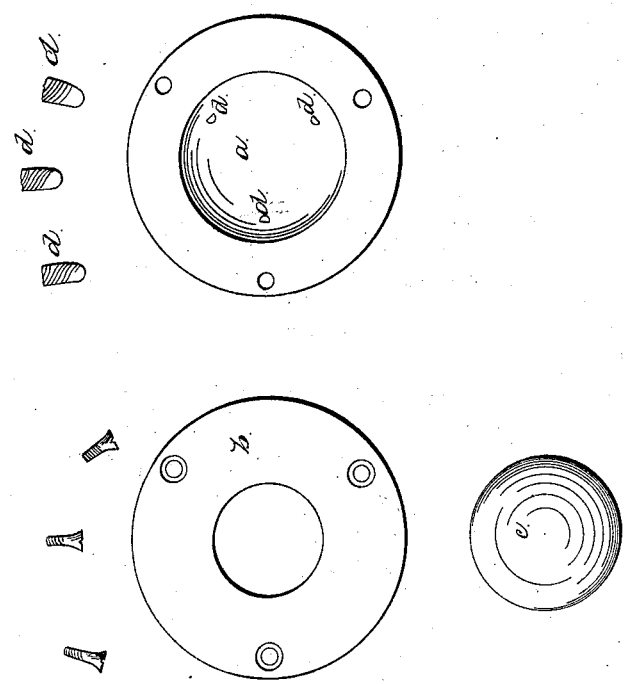
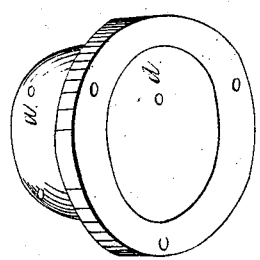

UNITED STATES PATENT OFFICE.

A. F. AHRENS, OF PHILADELPHIA, PENNSYLVANIA.

BALL-CASTER.

Specification of Letters Patent No. 5,102, dated May 8, 1847.

*To all whom it may concern:*

Be it known that I, ADOLPH F. AHRENS, of the city and county of Philadelphia and State of Pennsylvania, have invented a new and useful Improvement in Casters for Furniture, Gun-Carriages, &c., and that the following is a full, clear, and exact description of the principle or character which distinguishes it from all other things before known and of the manner of making, constructing, and using the same, reference being had to the accompanying drawings, making part of this specification, in which—

Figure 1 is the caster in plan; Fig. 2, the case in perspective; Fig. 3, projection of case of the caster and cover detached, and Fig. 4, a view of the ball.

The same letters indicate like parts in all the figures.

There have been casters made heretofore with balls and sockets, but in those there was nothing to keep the ball from the socket, or rollers were interposed; in these the rollers are difficult to manufacture and adjust in proper position so as to have them all bear properly on the ball their expense is great and they are found in practice to work with great friction. A great difficulty has arisen from their striking for when rollers are used a portion of them only can act at a time and the others will scrape over the surface of the ball as it turns, especially when there is a great weight brought onto them; but by my improvements I obviate these objections, and construct a cheap, useful and efficacious caster that will always act even under great pressure.

The construction is as follows: A semispherical socket or case (*a*) is made with a flanch projecting outward around its edge onto which a flat cover (*b*) is screwed with a hole in the center sufficiently large for the caster ball (*c*) to project through in the curved part of the case there are three or more holes bored at an angle of about 45° which point radially in toward the center; into these holes case hardened screws (*d*) are inserted which project a little into the interior and on them a perfectly spherical ball (*c*) rests and turns. When this ball is put into place the cap (*b*) is screwed down and secures the ball and the caster is complete, and will not under ordinary circumstances strike or be liable to get out of order the points being readily and easily adjustable.

Having thus fully described my improvement, what I claim as my invention and desire to secure by Letters Patent is—

Supporting the ball of a ball-and-socket caster within the socket on points, substantially in the manner and for the purpose described.

ADOLPH F. AHRENS.

Witnesses:
 J. J. GREENOUGH,
 A. P. BROWNE.